No. 696,454. Patented Apr. 1, 1902.
M. T. A. KUBIERSCHKY.
ELECTRICALLY OPERATED PLOW.
(Application filed Oct. 17, 1901.)

(No Model.) 3 Sheets—Sheet 3.

Witnesses.
Ewing R. Gurney
Benjamin B. Hull

Inventor.
Martin T. A. Kubierschky.
by Albert G. Davis
Atty.

THE NORRIS PETERS CO., PHOTO-LITHO., WASHINGTON, D. C.

UNITED STATES PATENT OFFICE.

MARTIN T. A. KUBIERSCHKY, OF BERLIN, GERMANY.

ELECTRICALLY-OPERATED PLOW.

SPECIFICATION forming part of Letters Patent No. 696,454, dated April 1, 1902.

Application filed October 17, 1901. Serial No. 78,931. (No model.)

*To all whom it may concern:*

Be it known that I, MARTIN T. A. KUBIERSCHKY, a subject of the Emperor of Germany, residing at Berlin, Germany, have invented certain new and useful Improvements in Electrically-Operated Plows, (Case No. 2,287,) of which the following is a specification.

This invention relates to power-driven plows, and especially those operated by an electric motor carried on the plow, the movement being effected by means of a chain stretched over the field and made fast at each end and along which run chain-wheels actuated by the motor.

My invention consists in a plow of this kind provided with two sets of shares, one set operating when the plow runs in one direction and the other set when the plow runs back. In each case the inoperative set is raised out of the way by means of gearing temporarily connected with the plow-motor. My plow runs on three wheels, which stand at the angles of an equilateral triangle, within which falls the main weight of the machine, so that the plowshares are thus kept from drawing out of the earth.

Figure 1:
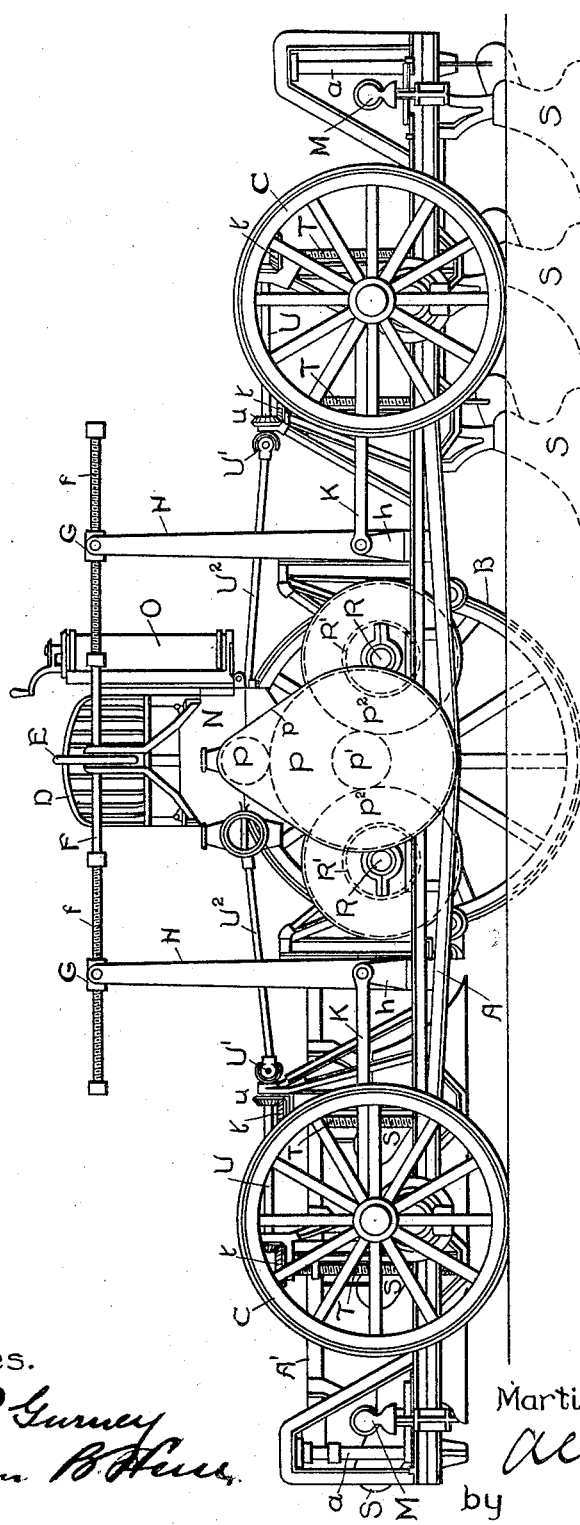
Figure 2:
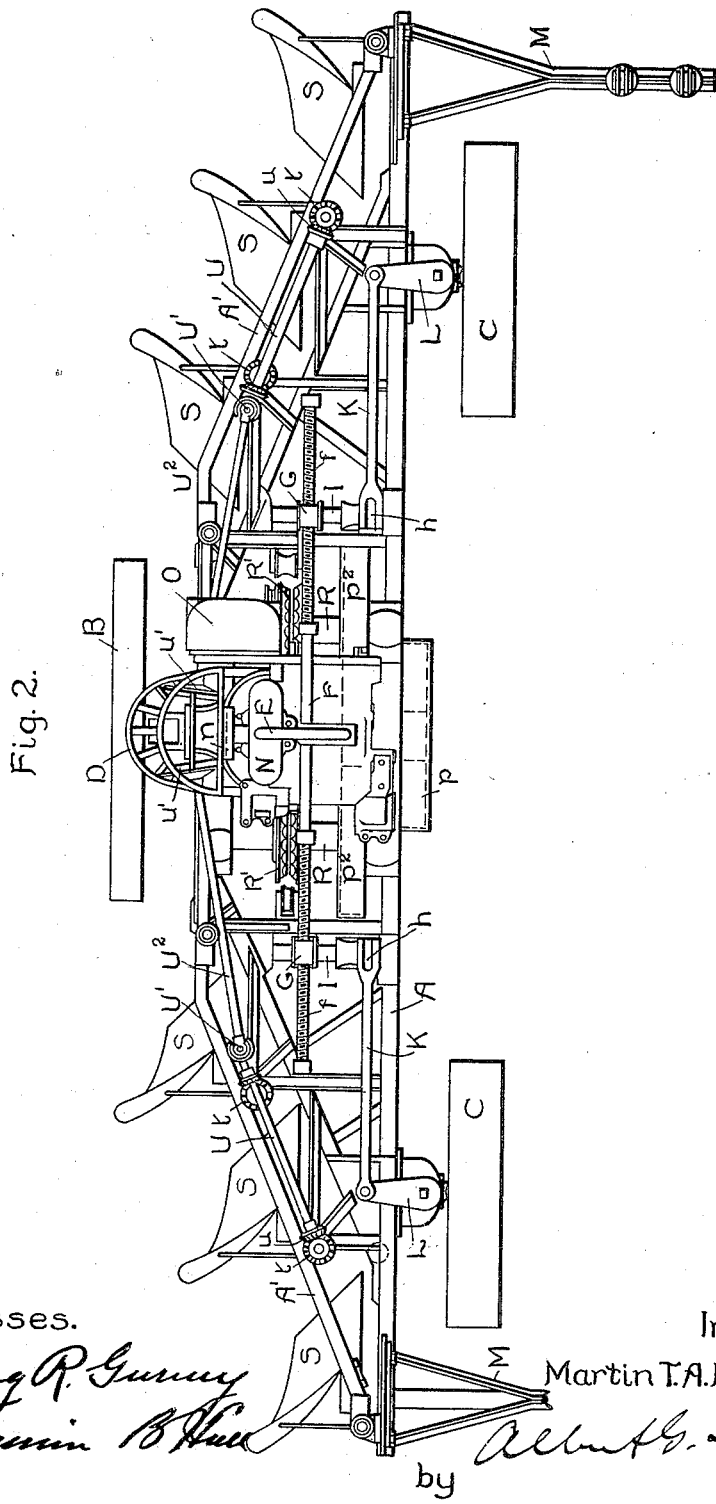
Figure 3:
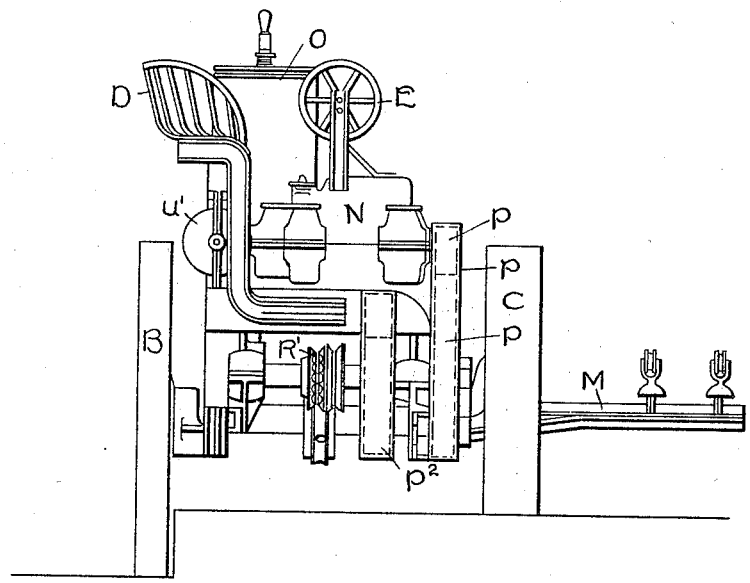
Figure 4:
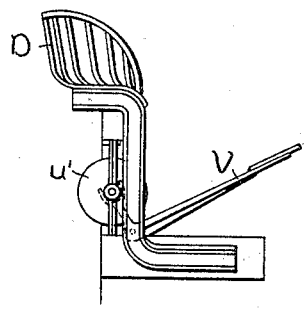

In the accompanying drawings, Figure 1 is a side elevation of my improved plow. Fig. 2 is a top plan view of the same. Fig. 3 is an end sectional elevation. Fig. 4 is a detail.

The frame A of the plow is substantially triangular, and at the angles stand the furrow-wheel B and the smaller ground-wheels C. Above the furrow-wheel is the seat D for the plowman, who steers the plow by a hand-wheel E, rotating a shaft F, on which are right-hand and left-hand screw-threads $f$, meshing with nuts G in the upper ends of the lever-arms H on rock-shafts I. Short rock-arms $h$ on said shafts are connected by links K with cranks L on the pivoted brackets on which the ground-wheels are mounted. This mechanism enables both ground-wheels to be turned simultaneously to cause the plow to run in a curve. At one or both ends of the frame is a horizontal trolley-pole M, taking current for the motor N, which is controlled by a controller O, adjacent to the plowman's seat. The motor is geared down by the pinion and gear P in a gear-case $p$ and the pinion P' and the gears $P^2$ to the two parallel transverse shafts R, on which are mounted the chain wheels or whelps R' in line with each other. A chain is led around said wheels, and the ends are made fast at each side of the field. When the motor is operated, it effects a movement of the plow along the chains.

At each end of the plow is a set of plowshares S. The set which is at the rear when the machine is moving is the one which does the work. The forward set must be raised above the surface of the ground at such times. In order to be able to raise the unoccupied set, the shares are mounted on carriers A', which are vertically movable on suitable guides $a$. Upright screws T, rotatable in bearings in the main frame, engage with nuts on the carrier and have at their upper ends bevel-gears $t$, meshing with similar gears $u$ on a shaft U. One end of said shaft is connected by a universal joint U' with a shaft $U^2$, carrying a bevel friction gear-wheel $u'$, which by means of a foot-lever V can be brought into temporary engagement with a beveled friction-pinion $n$ on the shaft of the motor. The rotation of the shafts thus effected causes the screws to raise or lower the carrier, as may be desired.

The triangular base or support gives great stability to the machine and enables it to accommodate itself perfectly to the inequalities of the ground. The shares are so arranged that they are automatically held to their work by the weight of the machine and are thus prevented from slipping out of the earth, the main weight and line of draft falling inside the triangular base.

What I claim as new, and desire to secure by Letters Patent of the United States, is—

1. A plow having a propelling-motor, two sets of shares, and means for raising and lowering each set by means of the plow-motor.

2. A plow having an electric propelling-motor, two sets of shares, separate mechanism for raising and lowering each set, and means for connecting either mechanism with said motor.

3. A plow having an electric propelling-motor, two sets of shares, a vertically-movable carrier for each set, mechanism for operating said carrier, and means for connecting said mechanism with said motor.

4. A plow having an electric propelling-motor, two sets of shares, a vertically-movable carrier for each set, upright screws for operating each carrier, gearing for rotating said screws, and means for connecting said gearing with said motor.

5. A plow having an electric propelling-motor, two sets of shares, a vertically-movable carrier for each set, gearing for operating said carriers, a movable shaft having a friction-wheel and connected with said gearing, a friction-wheel driven by said motor, and a lever for throwing said friction-wheels together.

6. A plow having a propelling-motor and a straight triangular frame, a wheel at each corner thereof, and two sets of shares arranged to work on lines falling inside of the triangular base.

7. A power-driven plow having a steering-wheel at each end, a rock-shaft for each wheel, and a right and left hand screw connecting lever-arms on said shafts.

In witness whereof I have hereunto set my hand this 27th day of September, 1901.

MARTIN T. A. KUBIERSCHKY.

Witnesses:
WOLDEMAR HAUPT,
HENRY HASPER.